United States Patent [19]
Roberts

[11] Patent Number: 5,950,726
[45] Date of Patent: Sep. 14, 1999

[54] INCREASED OIL AND GAS PRODUCTION USING ELASTIC-WAVE STIMULATION

[75] Inventor: John C. Roberts, Oklahoma City, Okla.

[73] Assignee: Atlas Tool Company, Oklahoma City, Okla.

[21] Appl. No.: 08/906,585

[22] Filed: Aug. 5, 1997

Related U.S. Application Data

[60] Provisional application No. 60/023,462, Aug. 6, 1996.

[51] Int. Cl.⁶ .................................................. E21B 43/25
[52] U.S. Cl. ........................................ 166/249; 166/117.6
[58] Field of Search ............................. 166/177.6, 177.7, 166/105, 249

[56] References Cited

U.S. PATENT DOCUMENTS

| | | | |
|---|---|---|---|
| 2,700,422 | 1/1955 | Bodine, Jr. | 166/249 |
| 2,894,724 | 7/1959 | Andrew | 166/177.6 X |
| 3,048,226 | 8/1962 | Smith | 166/249 X |
| 3,923,099 | 12/1975 | Brandon | 166/249 |
| 5,586,602 | 12/1996 | Vagin | 166/249 |

*Primary Examiner*—George Suchfield
*Attorney, Agent, or Firm*—Crowe & Dunlevy

[57] ABSTRACT

An apparatus and method for increasing subterranean fluid production are disclosed. A downhole stimulation apparatus produces elastic wave energy which propagates into the subterranean strata of nearby fluid fields. The wave energy creates gravity separation of the fluids, altering the phase permeability of subterranean formations and causing the fluid to migrate to wells in the field being stimulated. The stimulation apparatus employs an underground casing which provides a sealed vessel in which is supported a tubing string. The casing and tubing string are filled with a working fluid. A pumping unit reciprocates a plunger within the tubing string to cyclically pressurize and depressurize the working fluid, the depressurization of working fluid creating the elastic wave energy.

20 Claims, 4 Drawing Sheets

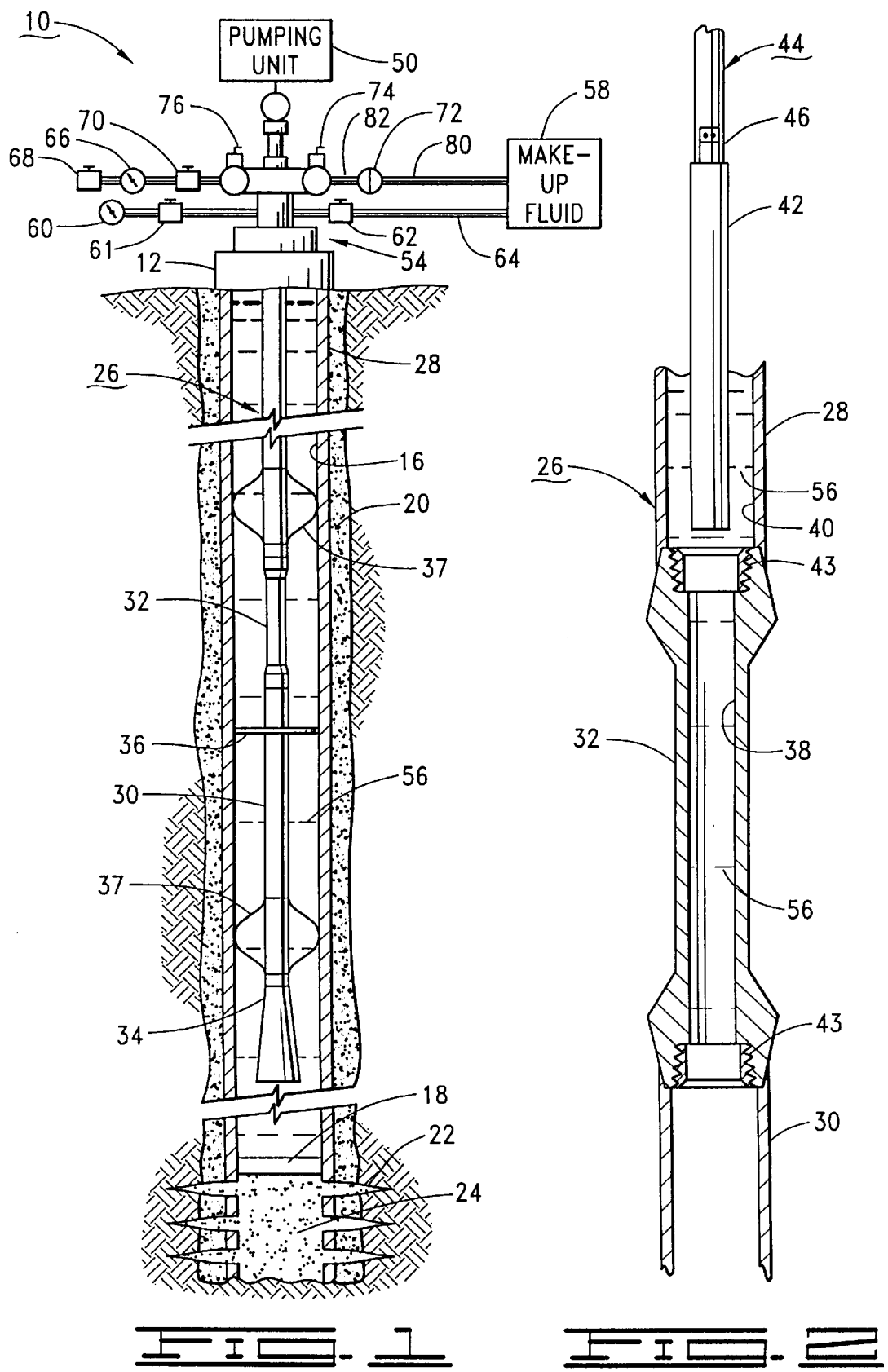

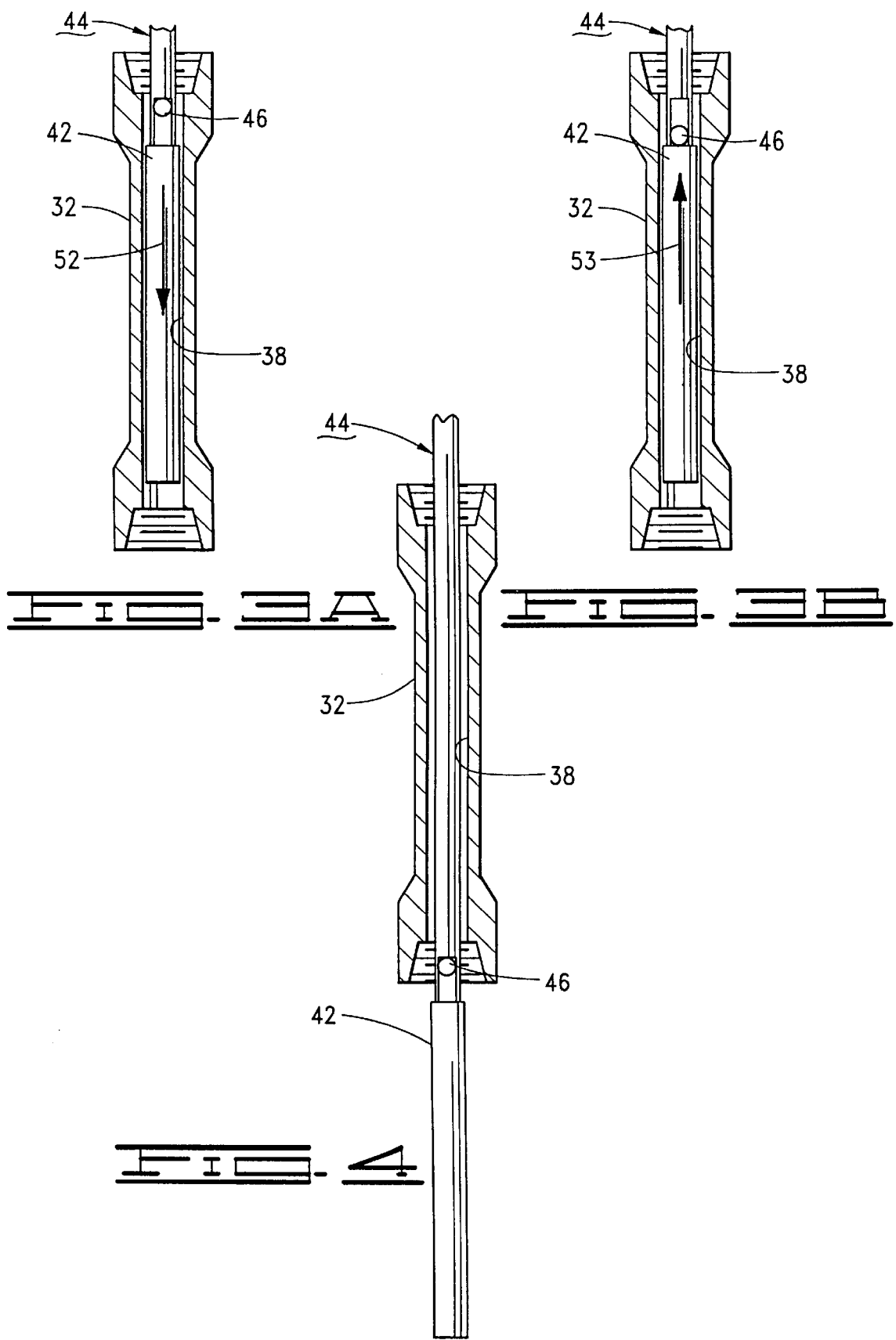

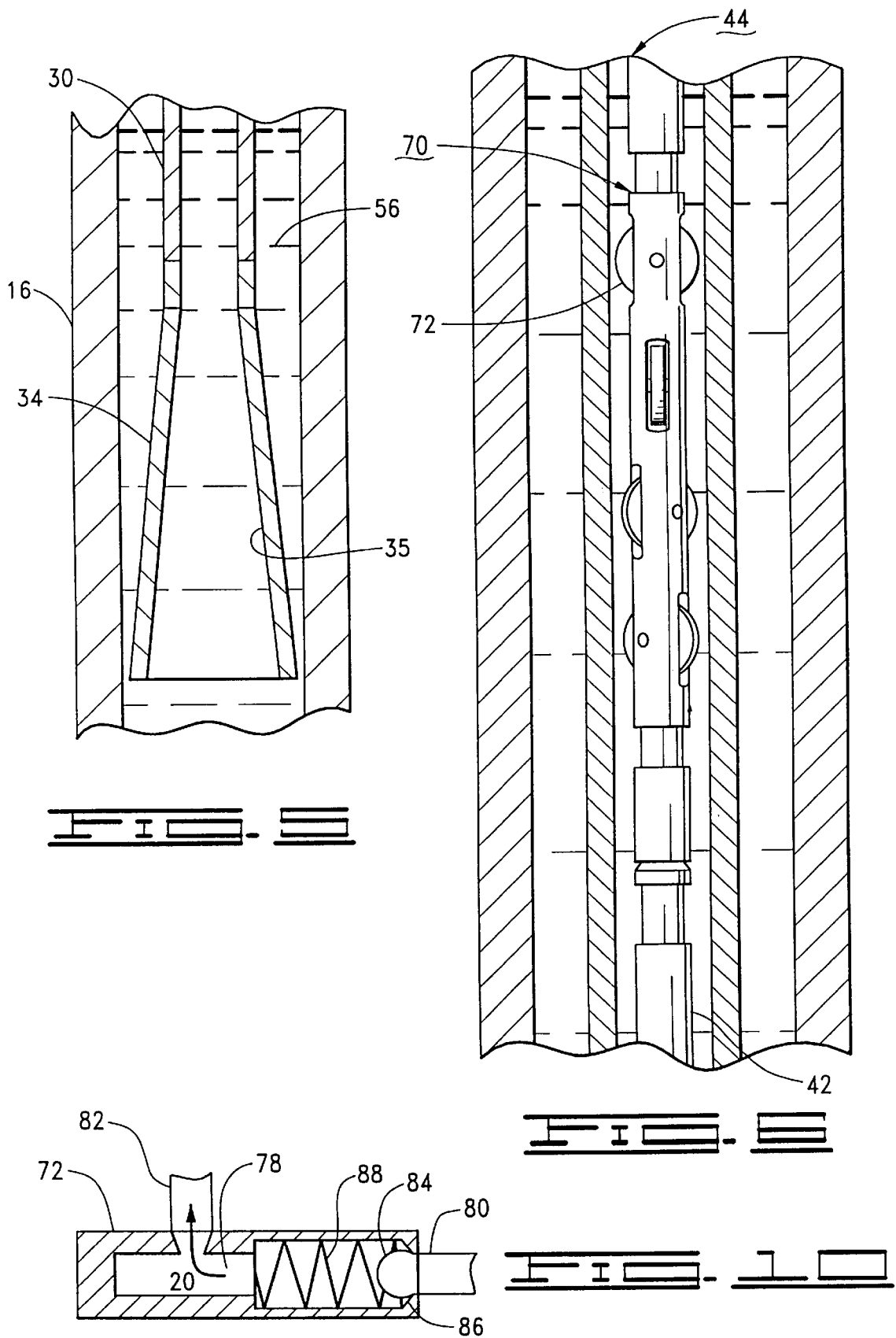

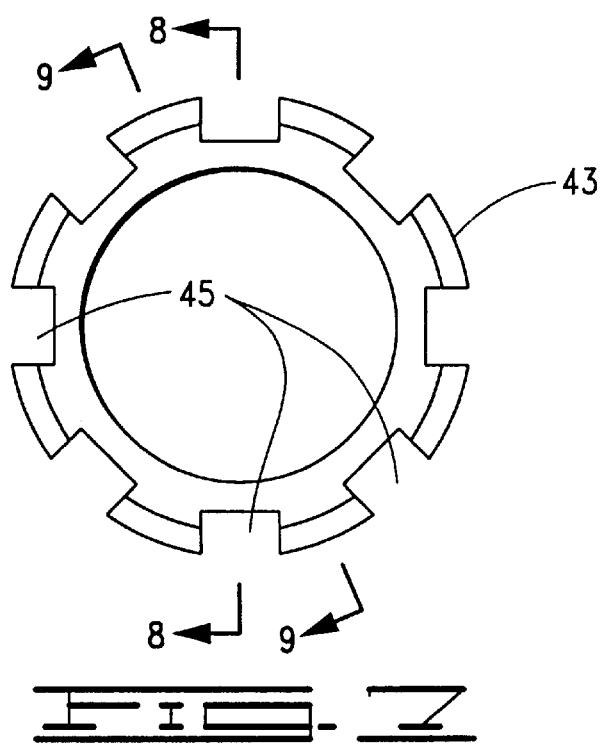
FIG. 7
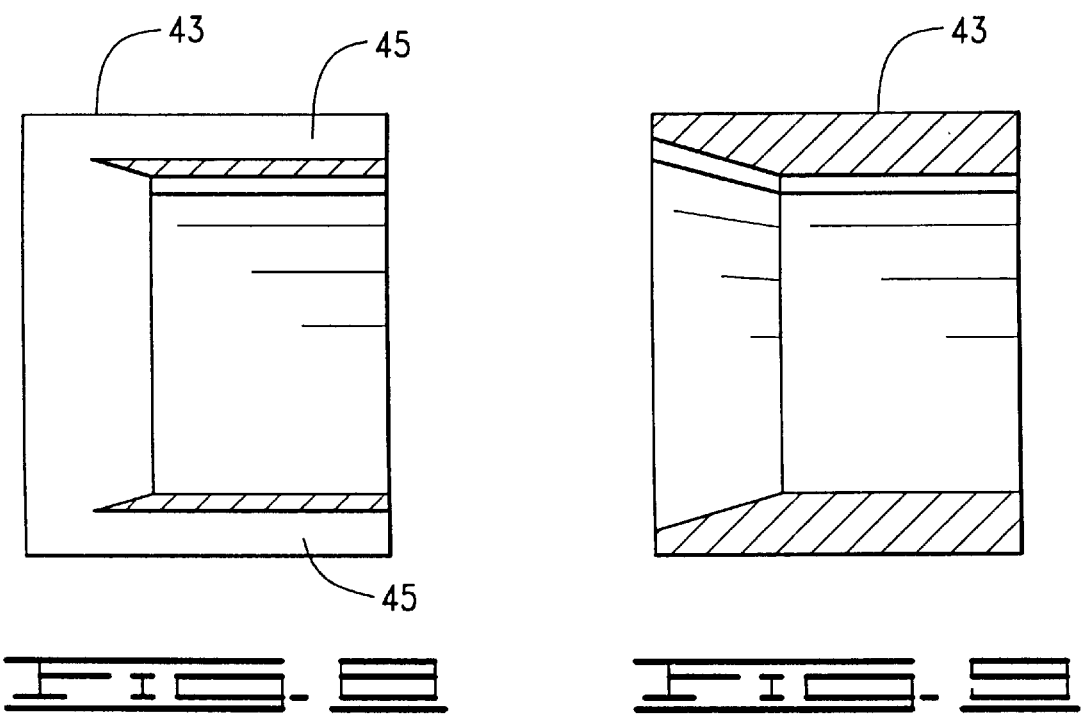
FIG. 8
FIG. 9

INCREASED OIL AND GAS PRODUCTION USING ELASTIC-WAVE STIMULATION

CROSS-REFERENCE TO RELATED APPLICATION

This application claims priority to U.S. Provisional Application Ser. No. 60/023,462 filed Aug. 6, 1996, hereby incorporated by reference.

BACKGROUND

1. Field of the Invention

The present invention relates generally to subterranean drilling for fluid production, and more particularly but not by way of limitation, to an apparatus and method for increasing production through the use of elastic wave stimulation.

2. Discussion

A well known problem associated with oil and gas production is the general reduction over time in the amount that can be extracted from a field. Typically, the natural pressure in a subterranean oil field is sufficient to result in no more than about ten percent of the oil contained in the formation. The residual amount is difficult to produce because of its very low mobility. Accordingly, recovery of these residual amounts is of great concern to the oil and gas industry.

The oil and gas industry has painstakingly attempted to develop efficient and effective methods for enhanced oil recovery (EOR). Historically, the prior art is replete with methodologies designed to augment oil and gas production, including water, steam and gas injection, chemical surfactants, hydraulic and explosive fracturing, and layer burning. Recent scientific observations of earthquake activity, however, show a correlation between seismic waves generated by the earthquake and nearby oil and gas production.

Scientific experimentation to duplicate the effects of seismic waves produced by an earthquake have been successful in stimulating the production of oil and gas fields. There are promising new technologies being developed which produce elastic wave energy for well stimulation. The effect of elastic wave energy has been proven to alter the permeability of subterranean oil formations, which has an excitation effect and can appreciably increase the mobility of the oil.

An elastic wave energy approach to well stimulation avoids the well known disadvantages associated with the historically known methods, which were largely undesirable because they were costly, required shutting in production, and created harmful ecological consequences.

New technologies being developed for elastic wave stimulation of oil are currently focused on ultrasonic wave generation and on vibroseis-type wave generation. However, there is a need for an improved approach to generating elastic wave energy, preferably one that employs well known drilling methodologies to provide an inexpensive yet effective and reliable approach. Furthermore, there is a need for an improved approach that is capable of stimulating more than one well at once in order to reduce the expense and complexity of the procedure.

SUMMARY OF THE INVENTION

The present invention provides an apparatus and a method for increasing production in oil and gas fields using elastic wave stimulation. More particularly, weak elastic (nondestructive) waves of energy are sent vertically and horizontally into the producing formation or multiple formations. These waves result in gravity segregation of oil and water, altering the phase permeability of subterranean formations and causing otherwise immovable/unswept oil to migrate towards nearby producing wells in the area surrounding the point of stimulation.

The present invention employs a subterranean sealed vessel which is formed by attachment of a common casing to a wellhead, with a downhole plug positioned above any perforation in the casing. A tubing assembly is also supported by the wellhead, and located within the casing. Attached to the lower end of the tubing string is a power cylinder which has a reduced inner diameter as compared to the tubing string. Attached to the lower end of the power cylinder is another tubing section, preferably a pump barrel section. Attached to the pump barrel is a conical projector member which is open at its bottom end adjacent the plug.

A working fluid, such as water, substantially fills the sealed vessel and the tubing assembly. A plunger is reciprocated within the tubing assembly by a pumping unit, such as a pumpjack. The plunger has a central passage communicable with the working fluid. A travelling ball valve attached at an upper end of the plunger seals the central passage to prevent the flow of working fluid through the plunger during a plunger upstroke.

As the plunger moves upwardly through the power cylinder with its central passage sealed closed, it pressurizes the working fluid contained in the tubing string above the power cylinder. At an upper limit of travel of the plunger, the bottom end is withdrawn from the power cylinder allowing the pressurized working fluid to rush downward to equalize against the unpressurized working fluid in the pump barrel. This rushing of working fluid through the power cylinder creates elastic energy waves which propagate downwardly through the working fluid and into the casing which conducts the waves into the subterranean strata.

Accordingly, an object of the present invention is to increase the production of subterranean fluid from a field.

Another object is to increase such production in an economic and efficient manner.

Yet another object is to provide the capability of utilizing existing, conventional equipment such as an existing well and pumpjack assembly in conjunction with the practice of the present invention.

These and other objects and features as well as advantages which characterize the present invention will be apparent from a reading of the following detailed description and a review of the associated drawings.

BRIEF DESCRIPTION OF THE DRAWINGS

FIG. 1 is a partial cross-sectional schematic representation of a stimulation unit made in accordance with the present invention.

FIG. 2 is a partial cross-sectional view of the power cylinder and plunger portions of the stimulation unit of FIG. 1, showing the plunger position at the upper limit of travel of the working fluid pressurization cycle.

FIG. 3A is a partial cross-sectional view of the plunger and power cylinder of FIG. 1, showing the orientation of the traveling ball valve when the plunger is in a downstroke portion of the working fluid pressurization cycle.

FIG. 3B is a partial cross-sectional view of the plunger and power cylinder of FIG. 1, showing the orientation of the traveling ball valve in a closed position when the plunger is in an upstroke portion of the working fluid pressurization cycle.

FIG. 4 is a partial cross-sectional view of the plunger and power cylinder of FIG. 1, showing the plunger position at the lower limit of travel of the working fluid pressurization cycle.

FIG. 5 is a cross-sectional detail view of the projector of the stimulation unit of FIG. 1.

FIG. 6 is a partial cross-sectional view of the roller assembly portion of the sucker rod assembly of the stimulation unit of FIG. 1.

FIG. 7 is a top plan view showing the plunger guide of the power cylinder of FIG. 2.

FIG. 8 is a cross-sectional view of the plunger guide taken along the section line 8—8 of FIG. 7.

FIG. 9 is a cross-sectional view of the plunger guide taken along the section line 9—9 of FIG. 7.

FIG. 10 is a partial cross-sectional view of the check valve injector of FIG. 1.

DETAILED DESCRIPTION OF THE PREFERRED EMBODIMENT

The preferred embodiment of the present invention is shown in the attached drawing FIGS. 1–10, which will be used in the description that follows. Beginning with FIG. 1, shown therein is a schematic, cross-sectional representation of a stimulation unit 10 made in accordance with the present invention. The stimulation unit 10 has a wellhead 12 which supports a subterranean casing 16. A plug 18, either a permanent or temporary type, is installed downhole within the casing 16. The wellhead 12, casing 16, and plug 18 form a sealed vessel which is substantially filled with a working fluid 56, such as water.

The casing 16 is secured to the subterranean strata by a concrete column 20. FIG. 1 shows one embodiment wherein the plug 18 is installed just above an existing perforation 22 in a live or abandoned well, and where packed sand 24 is shown filling the downhole portion below the plug 18.

A tubing assembly 26 is supported by the wellhead 12 and disposed within the casing 16. The tubing assembly 26 has a tubing string 28 and a lower tube section which is preferably made from a common pump barrel 30. A power cylinder 32 is disposed between the tubing string 28 and the pump barrel 30 and has a central opening contiguous therewith.

A hollow conical projector 34 is supported by the lower end of the pump barrel 30. The projector 34 serves to amplify and direct energy waves produced by the stimulation unit 10, as will be further discussed below.

One or more stabilizers 36 may be positioned about the outer diameter of the tubing string 28 and the pump barrel 30, the stabilizers 36 thereat abuttingly engaging the inner diameter of the casing 16 so as to support and stabilize the tubing assembly 26 and to maintain it substantially centrally disposed within the casing 16. FIG. 1 shows one stabilizer 36 installed on the pump barrel 30. Additionally, one or more common tube string anchors 37 are employed to support the tubing assembly 26 to prevent unwanted movement and vibration of the tubing assembly 26 during operation.

Turning now to FIG. 2, shown therein is a cross-sectional view of the power cylinder 32, having a bore 38 which is smaller than an inner diameter 40 of the upper tubing string 28. A plunger 42 is slidingly disposed within the tubing assembly 26, supported by a conventional sucker rod assembly 44 attached to a conventional traveling ball valve 46 at the upper end of the plunger 42. A plunger guide 43 is press-fitted into each end of the power cylinder 32, providing a tapered opening and a closely fitting bore for the plunger 42.

The sucker rod assembly 44 is reciprocatingly supported by a pumping unit 50 shown diagrammatically in FIG. 1. Reciprocation of the pumping plunger 42, in cooperation with the power cylinder 32, to induce a working fluid pressurization cycle as described below. The sucker rod assembly 44 reciprocates within the wellhead 12 by the use of a resilient seal provided by a conventional high pressure stuffing box 54.

In the preferred embodiment of the present invention, the pumping unit 50 comprises a conventional pumpjack assembly, as is commonly employed in the field and may be readily available if the stimulation unit 10 is installed in a live or abandoned well. Alternatively, the pumping unit 50 may comprise other power sources, such as a hydraulic power unit coupled with a cylinder having an extensible shaft.

Referring now to FIGS. 3A, 3B, and 4, shown therein are additional views of the power cylinder 32, with the plunger guide 43 omitted for purposes of clarity. More particularly, FIG. 3A illustrates a portion of the working fluid pressurization cycle wherein the plunger 42 is moving downward, as shown by directional arrow 52, within the bore 38 of the power cylinder 32. FIG. 3B illustrates a portion of the working fluid pressurization cycle wherein the plunger 42 is moving upward as shown by directional arrow 53, within the bore 38. FIG. 2 illustrates another portion of the working fluid pressurization cycle wherein the plunger 42 has reached an upward limit of travel, wherein the plunger 42 is removed above the bore 38. FIG. 4 illustrates yet another portion of the working fluid pressurization cycle wherein the plunger 42 has reached a downward limit of travel, wherein the plunger 42 is removed below the bore 38.

Having addressed the chief points of construction, attention now is turned to the operation of the preferred embodiment. Referring generally to FIG. 1, the working fluid 56 substantially fills the tubing assembly 26 and the sealed vessel formed by the wellhead 12, the casing 16 and the plug 18. The reciprocating plunger 42 imparts a cyclic pressurization of the working fluid, and a make-up working fluid source 58 provides replacement working fluid to compensate for any leakage in the sealed vessel.

In considering the working fluid 56 pressurization cycle, FIG. 3A first illustrates a downward motion of the plunger 42 within the bore 38. At this time the traveling ball valve 46 is in a raised and open position so as to permit working fluid 56 to pass freely through the plunger 42 and past the sucker rod assembly 44 as the plunger moves downward. In this manner the movement of the plunger 42 downward through the working fluid 56 is unobtrusive, that is, downward movement of the plunger 42 does not impart pressurization to the working fluid 56.

One skilled in the art will readily recognize that it may be advantageous to couple the pumping unit 50 to the sucker rod assembly 44 by way of a cable connection (not shown), such as where a pumpjack is employed as the pumping unit 50. In this case the downward motion of the plunger 42 is dependent on gravitational force. As such, it may be necessary to include a number of conventional sucker bars in the sinker rod assembly 44 to prevent floating or working fluid pounding of the plunger 42.

FIG. 4 illustrates the downward limit of plunger 42 travel, after which the plunger 42 then begins an upward stroke. FIG. 3B illustrates a portion of the working fluid 56 pressurization cycle subsequent to that of FIG. 4 wherein the plunger 42 is upwardly traversing the bore 38. At this time the traveling ball valve 46 is in a lowered and closed position to prevent the flow of working fluid 56 through the plunger 42. The upward displacement of the plunger 42, therefore, pressurizes the column of working fluid 56' (see FIG. 2) in the tubing string 28 to pressures greater than that of the working fluid 56 in the pump barrel 30.

Continued upward movement of the plunger 42 within the bore 38 raises the pressure of the pressurized working fluid 56' until such time that the lower end of the plunger 42 moves upwardly out of the bore 38, as is shown in FIG. 2. At this time a flow path is provided between the diameter 40 (of the tubing string 28) and the plunger 42, causing the pressurized working fluid 56' to rush downwardly into the bore 38 as a result of the pressure differential between the pressurized working fluid 56' and the unpressurized working fluid 56 below. As the pressurized working fluid 56' rushes downwardly it impingingly engages the unpressurized working fluid 56 below. This impinging engagement imparts a series of elastic energy waves (not shown) which propagate through the working fluid 56.

FIG. 7 shows the guide 43 has a series of grooves 45 to channel the rushing pressurized working fluid 56' about the periphery of the bore 38 so as to prevent working fluid pounding. FIG. 8 shows a cross-sectional view of the guide 43 across opposing grooves 45 while FIG. 9 shows a cross-sectional view across the substantial outer diameter of the guide 43.

The wave energy propagates downwardly through the working fluid 56 to the end of the pump barrel 30. FIG. 5 shows a cross-sectional view of the projector 34 which is open at a bottom face thereof, so that working fluid 56 inside the projector 34 is directly communicable with the working fluid 56 in the surrounding casing 16. The projector 34 forms a conical inner surface 35 near the bottom face which stretches the energy waves as they propagate downward, thereby maximizing the distribution of the energy wave upon the face of the plug 18 below.

The packed sand 24 and concrete column 20 beneath the plug 18 facilitate wave energy conduction into the subterranean strata. A portion of the wave energy may be reflected upwardly from the plug 18, some of which will be conducted through the casing 16 and some of which will be reflected downwardly again by the stabilizer 36 to then conduct through the casing 16 or through the plug 18.

The working fluid 56 pressure will substantially equalize as the wave energy is dispersed to the subterranean strata, and thus the working fluid 56 will be amenable to another pressurization stroke to once again be pressurized and then relieved to create another sequence of energy waves. The reciprocal motion of the stimulation unit 10 thus delivers a cyclic pattern of energy waves, the magnitude and frequency of which may be determined by the stimulation needs of the oil fields of concern. For reference, sufficient wave energy is created to stimulate oil and gas fields within a 1 to 1- ½ mile radius with peak working fluid pressures below 3000 psi at a frequency of less than ten pressurization cycles per minute, and such wave energy is within the limits of commonly known elastic (nondestructive) type wave energy.

The depth to which the tubing string 28 is run is determined subject to a number of limitations. For example, the depth can be limited by the depth of an existing casing 16 selected for use as a stimulation well. Also the depth can be limited by the yield strength of sucker rod 44 or tubing string 28 components at greater depths. Generally, it has been found preferable to drop the tubing string to about 50% of the stimulation well depth for shallow wells, less than about 1,000' feet, and to about 20% to 30% for deeper stimulation wells. For reference, the following equation has been found useful in providing a first approximation for the length ($L_t$) of a tubing string (such as the tubing string 28) in a stimulation well:

$$L_t = \frac{(d_{pl}^2)(L_{str})(L)(B)}{(P_{req})(d_{td}^2 - d_{rd}^2)} \quad (1)$$

where:

$L_t$= length of tubing string (centimeters);

$d_{pl}$= diameter of plunger (centimeters);

$L_{str}$=length of stroke (centimeters);

L= ratio of total well depth to length of tubing string (percentage);

B= compressibility factor of the working fluid (constant);

$P_{req}$= desired pressure (use value in pounds per square inch and divide by 14.69);

$d_{td}$= inner diameter of tubing (centimeters); and $d_{rd}$= diameter of sucker rods (centimeters).

The compressibility factor B will have a value of 20,000 when water is the working fluid. Moreover, the desired pressure $P_{req}$ can be determined by dividing the pressure (in pounds/inch$^2$) by a metric conversion factor of 14.69. The resulting value for $L_t$ can then be divided by a factor of 30.48 to convert the tubing string length from centimeters to feet, to conform to the measurements commonly used in the industry.

It will be recognized that equation (1) can be advantageously used to obtain an initial approximation for the length for the tubing string 28, which can then be optimized for a given application. Particularly, it has been found that factors such as the size of the pumping unit, the depth of the well and the length of the stroke of the pumping unit can affect the actual pressure imparted to the working fluid 56'. Accordingly, once a length $L_t$ for the tubing string 28 has been selected, the pressure can be subsequently increased by increasing the stroke length of the plunger 42 and conversely decreased by decreasing the stroke length of the plunger 42, as desired.

Operating the stimulation unit 10 within an oil field substantially improves oil and gas production as energy waves emanate from the stimulation unit 10 as the result of the cyclic pressurization and release of working fluid 56 in the tubing assembly 26. These waves result in gravity segregation of oil and water, altering the phase permeability and causing otherwise immovable/unswept oil to migrate towards nearby producing wells in the area surrounding the point of stimulation. Additionally, although it is contemplated that the stimulation unit 10 will be operated continuously, after an extended amount of operation increased production continues to be enjoyed long after the operation of the stimulation unit 10 is discontinued, which is a significant advantage over prior art stimulation methods.

Returning now to FIG. 1, shown therein the wellhead 12 has a pressure gauge 60 for monitoring the pressure of the wellhead 12, which is readable by opening a ball valve 61. A ball valve 62 is used to unload the casing pressure if necessary, such as for maintenance. Unwanted gases in the casing can be vented by throttling open the valve 62, preferably during a plunger 42 downstroke. A vent line 64 returns expelled working fluid or vapor to the make-up working fluid reservoir 58.

The wellhead 12 furthermore has a pressure gauge 66 which enables the operator to monitor the cyclic pressure of the working fluid 56' as it is compressed within the tubing string 28. To read gauge 66, the operator would close a venting valve 68 and open valve 70. To vent unwanted gases which occasionally build up in the tubing assembly 26, the operator would open valve 68 and throttle valve 70 during a plunger 42 upstroke until working fluid 56' is yielded. A pair of isolation valves 74, 76 are provided to isolate all externals from the tubing assembly 26 if necessary, such as for maintenance.

A check valve injector 72 allows water to flow from the make-up reservoir 58 to the casing, but prevents back-flow from the casing. FIG. 10 shows the check valve injector 72 to have a central passageway 78 which provides fluid communication between tube 80 from the make-up working fluid reservoir 58 and tube 82 to the wellhead 12 portion opening into the tubing assembly 26. The check valve injector 72 has a sealing ball 84 which is biased in a closed and sealing position against a valve seat 86 by a compressed spring 88. Downward movement of the plunger 42 draws working fluid 56 through the central passageway 78 in a direction shown by arrow 90 into the tubing string 28, by displacement of the ball 84 from the seat 86. Positive pressure of the working fluid 56' on a plunger 42 upstroke causes seating of the ball 84 and thus prevents reverse flow from the tubing string 28 into the make-up working fluid reservoir 58.

Finally, FIG. 6 provides an elevational, cross-sectional view of a conventional roller assembly 70 which is part of the sucker rod assembly 44. The roller assembly 70 is disposed above the plunger 42 a sufficient distance so as to not interfere with the vertical cycling of the plunger 42 relative the bore 38, but sufficiently close to the plunger 42 so as to substantially maintain the plunger 42 in a central disposition coextensively aligned with the bore 38. The number of rollers 72 in the roller assembly 70 will be determined by the wellsite conditions, as is common to one skilled in the art.

While the foregoing has described the use of the stimulation unit 10 of the present invention in improving the production of oil and gas wells, it has been proven that use of the stimulation unit is not limited to just oil and gas well utility. Use of the stimulation unit 10 will benefit any user who desires to increase subterranean fluid production, such as but not limited to, the production of water from an aquifer.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A downhole stimulation apparatus for increasing the production in subterranean fluid fields by pressurization and depressurization of a working fluid to create elastic wave energy, the stimulation apparatus comprising:

a subterranean sealed vessel;

a cylinder disposed within and supported by said vessel, said sealed vessel and said cylinder substantially fillable with the working fluid;

a plunger slidably disposed within said cylinder;

reciprocating means for reciprocating said plunger to selective positions below, within, and above said cylinder, wherein along a first range of positions below and within said cylinder a portion of the working fluid is pressurized, and wherein at a second position above said cylinder the working fluid is depressurized, and wherein the depressurization of the working fluid impingingly engages the pressurized portion of the working fluid against an unpressurized portion of the working fluid thereby inducing elastic wave energy into the working fluid which propagates through the working fluid into said vessel, and wherein said vessel conducts said wave energy into the subterranean fluid field.

2. The stimulation apparatus of claim 1 wherein said cylinder forms a cylinder inner diameter, and wherein said cylinder supports a power cylinder having a smaller inner diameter than that of said cylinder inner diameter.

3. The stimulation apparatus of claim 2 wherein said reciprocating means reciprocates said plunger to selective locations within a pressurization cycle, said pressurization cycle comprising:

a plunger upstroke portion having an upper limit of travel wherein said plunger is substantially above said power cylinder; and a plunger downstroke portion having a lower limit of travel wherein said plunger is substantially below said power cylinder;

wherein during said plunger upstroke portion said plunger pressurizes a portion of the working fluid within said cylinder above said power cylinder, until such time that a lower end of said plunger is upwardly withdrawn from said power cylinder whereat said pressurized working fluid expels into said power cylinder, wherein said expulsion creates elastic energy waves within said working fluid which propagate from said vessel into the subterranean strata.

4. The downhole stimulation apparatus of claim 3, wherein the subterranean vessel comprises:

a wellhead;

a casing attached to said wellhead and extending downhole therefrom; and a plug secured at a distal end of said casing opposite said wellhead.

5. The downhole stimulation apparatus of claim 1 wherein said reciprocating means comprises:

a pumpjack; and a sucker rod assembly depending from said pumpjack and in turn supporting said plunger.

6. The downhole stimulation apparatus of claim 1 wherein said reciprocating means comprises:

a hydraulic power unit; and a hydraulic cylinder responsive to said power unit and having an extensible shaft supporting said plunger.

7. The downhole stimulation apparatus of claim 4 wherein said plunger has a longitudinal passage, and wherein said plunger supports a traveling ball valve which seals the passage to prevent the flow of working fluid therethrough during said plunger upstroke portion of said pressurization cycle.

8. The downhole stimulation apparatus of claim 4 wherein said power cylinder supports a pump barrel at a lower end thereof, and wherein said pump barrel in turn supports a wave projector which forms a conical inner diameter opening toward said plug and directing the energy waves thereon.

9. The downhole stimulation apparatus of claim 4 further comprising a reflector member supported by said pump barrel which substantially fills an area between said barrel and said casing, providing a rigid member for reflecting energy waves downward toward said plug.

10. The downhole stimulation apparatus of claim 1 further comprising a working fluid make-up source for replenishing working fluid that leaks or is displaced from said vessel.

11. A downhole stimulation apparatus for increasing drilling production in subterranean fluid fields by pressurization and depressurization of a working fluid to create elastic wave energy, the stimulation apparatus comprising:

a downhole casing assembly forming a sealed vessel;

a tubing string supported by said casing, said tubing string having an inner diameter;

a power cylinder supported by said tubing string, said power cylinder having an inner diameter coextensive with and smaller than said tubing string diameter;

a pump barrel depending from a lower end of said power cylinder opposite said tubing string, said casing, tubing string, power cylinder and pump barrel substantially fillable with the working fluid;

a plunger slidably disposed and selectively locatable within said tubing string, power cylinder and pump barrel;

reciprocating means for reciprocating said plunger to selective positions within a pressurization cycle, said pressurization cycle having a plunger upstroke portion with an upper limit of travel wherein said plunger is substantially above said power cylinder, and having a plunger downstroke portion with a lower limit of travel wherein said plunger is substantially below said power cylinder;

wherein during said upstroke portion said plunger pressurizes a portion of the working fluid within said tubing string until such time that the lower end of said plunger is upwardly withdrawn from said power cylinder whereat the pressurized working fluid expels into said power cylinder, wherein the expulsion of pressurized working fluid impingingly engages pressurized working fluid against an unpressurized portion of working fluid so as to create elastic energy waves which propagate through the working fluid into said casing assembly, and wherein said casing assembly conducts said energy waves into the subterranean fluid fields.

12. The downhole stimulation apparatus of claim 11, wherein the casing assembly comprises:

a wellhead;

a casing attached to the wellhead and extending downhole therefrom;

a plug secured at the distal end of the casing opposite the wellhead.

13. The downhole stimulation apparatus of claim 11 wherein said reciprocating means comprises:

a pumpjack; and a sucker rod assembly depending from said pumpjack and, in turn, supporting said plunger.

14. The downhole stimulation apparatus of claim 1 wherein said reciprocating means comprises:

a hydraulic power unit; and a hydraulic cylinder responsive to said power unit and having an extensible shaft supporting said plunger.

15. The downhole stimulation apparatus of claim 12 wherein said plunger has a longitudinal passage, and wherein said plunger supports a traveling ball valve which seals said passage to prevent the flow of working fluid therethrough during said plunger upstroke portion of said pressurization cycle.

16. The downhole stimulation apparatus of claim 15 further comprising a wave projector supported by said pump barrel, which forms a conical inner diameter opening toward said plug and directing the energy waves thereon.

17. The downhole stimulation apparatus of claim 16 further comprising a reflector member supported by said pump barrel which substantially fills the area between said barrel and said casing, providing reflection of energy waves downward toward said plug.

18. The downhole stimulation apparatus of claim 1 further comprising a working fluid make-up source for replenishing working fluid that leaks or is displaced from said casing.

19. A method for imparting periodic elastic wave stimulation to the accumulation zone of an oil field having a plurality of producing wells, comprising the steps of selecting at least one well for wave generation; sealing the wave generation well so it is capable of functioning as a closed system; filling the well with a fluid; selectively reciprocating a plunger in the fluid with an appropriate stroke length in order to compress a portion of the fluid in the well to a desired pressure; suddenly releasing the compressed fluid into the remaining fluid, thereby creating a compression shock wave that travels to the well bottom; and repeating the steps of compressing and releasing the fluid.

20. A method of stimulating the flow of subterranean fluids being pumped to the surface from subterranean strata by drilling operations, said stimulating comprising the steps of:

providing a subterranean sealed vessel proximate the subterranean region to be stimulated;

supporting a tubing string within said sealed vessel, the tubing string having a reduced diameter cylinder at a medial portion of the tubing string;

substantially filling said tubing string and said subterranean vessel with a working fluid;

reciprocating a plunger from a lowest position below said cylinder to a position within said cylinder to pressurize a portion of said working fluid; and reciprocating said plunger to a highest position above said cylinder to depressurize said pressurized working fluid, wherein said pressurized working fluid impingingly engages an unpressurized portion of said working fluid to create energy waves through said working fluid, and wherein said energy waves propagate from said working fluid and through said sealed vessel into the subterranean strata.

* * * * *